United States Patent [19]

Nabors, Jr. et al.

[11] Patent Number: 5,554,022

[45] Date of Patent: Sep. 10, 1996

[54] BURNER APPARATUS AND METHOD

[75] Inventors: James K. Nabors, Jr., Apopka; William C. Andrews, Longwood, both of Fla.

[73] Assignee: Xothermic, Inc., Apopka, Fla.

[21] Appl. No.: 323,006

[22] Filed: Oct. 14, 1994

[51] Int. Cl.$^6$ ..................................................... F23C 7/00
[52] U.S. Cl. ................... 431/10; 431/8; 431/190; 431/12; 431/252; 431/351
[58] Field of Search ..................... 431/8, 10, 128, 431/159, 165, 252, 190, 351, 12

[56] References Cited

U.S. PATENT DOCUMENTS

| | | | |
|---|---|---|---|
| 2,149,980 | 3/1989 | Paret Jr. et al. | 431/8 |
| 4,378,205 | 3/1983 | Anderson | 431/5 |
| 4,439,137 | 3/1984 | Suzuki et al. | 431/8 |
| 4,475,885 | 10/1984 | Finke | 431/188 X |
| 4,494,923 | 1/1985 | Guillaume et al. | 431/9 |
| 4,541,796 | 9/1985 | Anderson | 431/187 |
| 4,622,007 | 11/1986 | Gitman | 432/13 |
| 4,790,743 | 12/1988 | Leikert et al. | 431/8 |
| 4,842,509 | 6/1989 | Hasenack | 431/8 X |
| 4,933,163 | 6/1990 | Fischer et al. | 423/574 |
| 4,954,076 | 9/1990 | Fioravanti et al. | 431/116 |
| 4,957,050 | 9/1990 | Ho | 110/346 |
| 4,988,285 | 1/1991 | Delano | 431/5 |
| 4,997,362 | 5/1991 | Hebel | 431/17 |
| 5,044,558 | 9/1991 | Young et al. | 431/8 X |

FOREIGN PATENT DOCUMENTS

| | | | |
|---|---|---|---|
| 0026024 | 2/1977 | Japan | 431/10 |
| 0063401 | 3/1991 | Japan | 431/8 |
| 838878 | 6/1960 | United Kingdom | 431/190 |

Primary Examiner—Carl D. Price
Attorney, Agent, or Firm—Willaims M. Hoppy, III

[57] ABSTRACT

A burner apparatus for the combustion of a fuel and an oxidizer includes a burner block having a fuel line for feeding fuel to a fuel port opening into a combustion chamber and a plurality of primary and secondary oxidizer lines positioned around the fuel line for feeding an oxidizer to a primary and secondary oxidizer port to the combustion chamber for combustion with the fuel from the fuel port. The primary and secondary oxidizer lines and ports are spaced around the fuel port so that controlling the oxidizer is used to change the position and shape of the flame in the combustion chamber. First and second oxidizer valves are located in the oxidizer feed lines and vary the amount of oxidizer fed through the oxidizer line so that the first and second oxidizer control valves for each set of oxidizer lines are spaced around the fuel port to allow both the position and the shape of the burner flame to be controlled. A method of controlling a flame's position and shape in a burner combustion chamber is provided by varying the feed of oxidizer to each pair of oxidizer ports and proportioning the oxidizer between each primary and adjacent secondary oxidizer port.

16 Claims, 3 Drawing Sheets

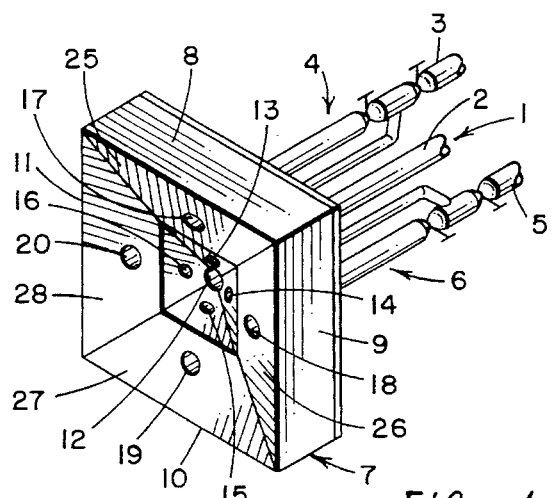
FIG. 1
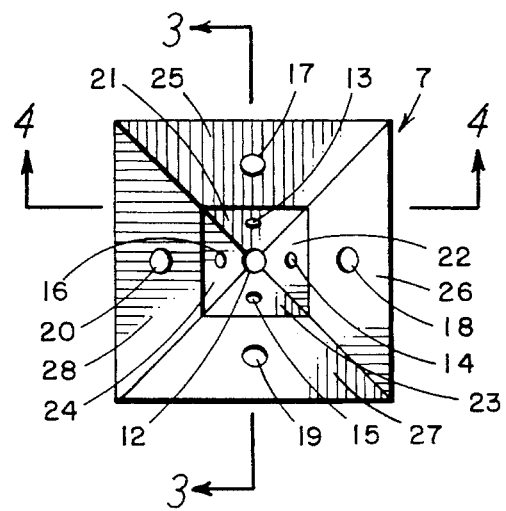
FIG. 2
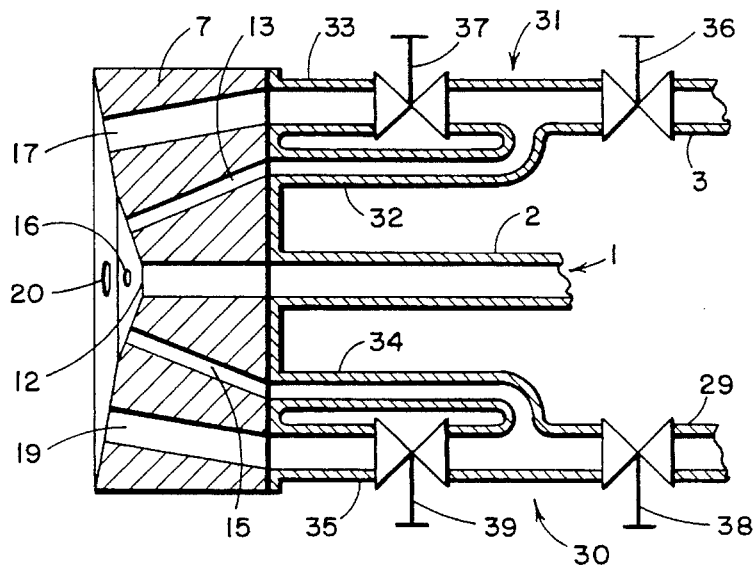
FIG. 3
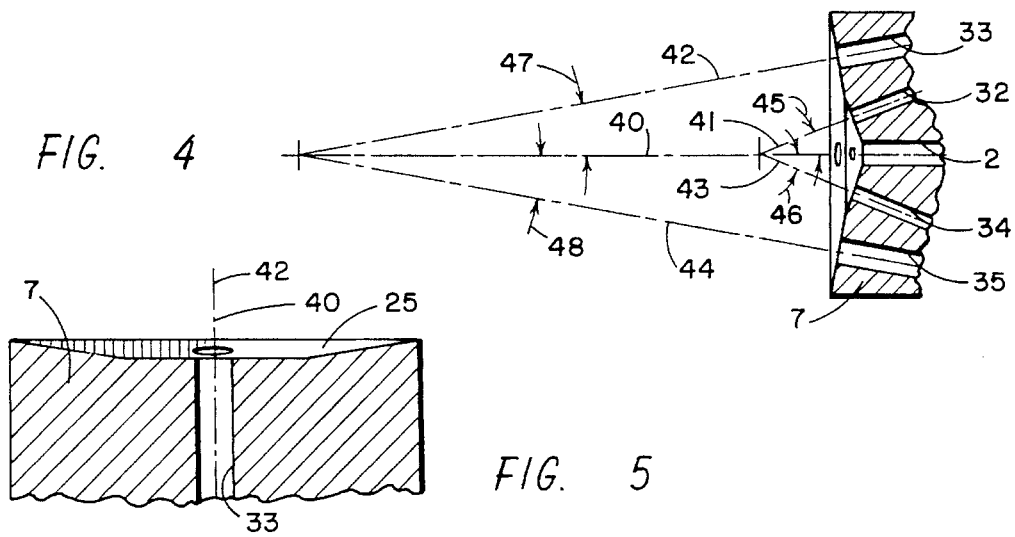
FIG. 4
FIG. 5

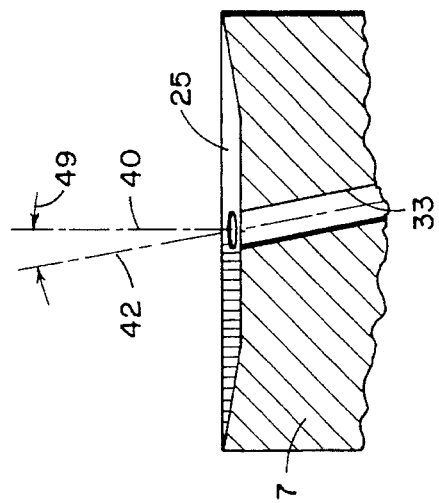
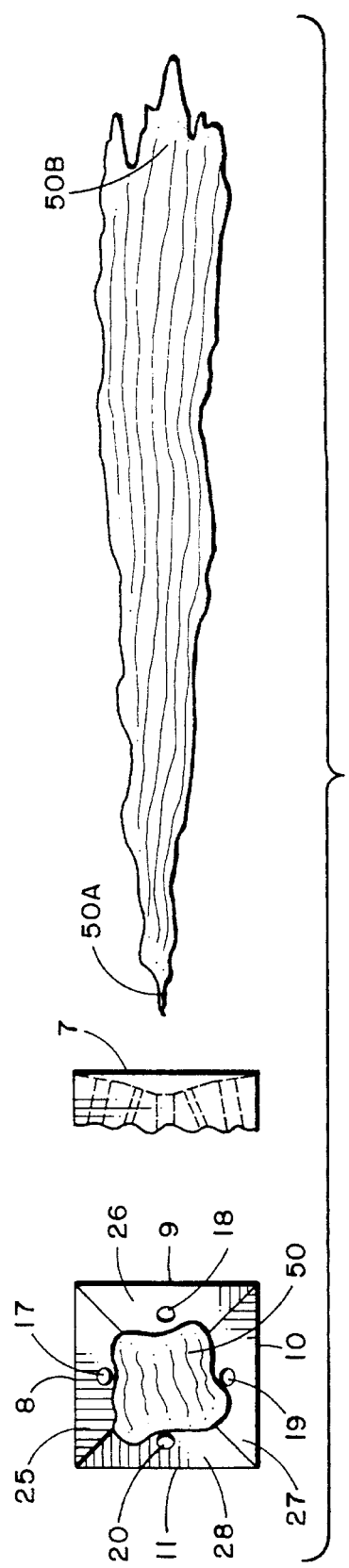
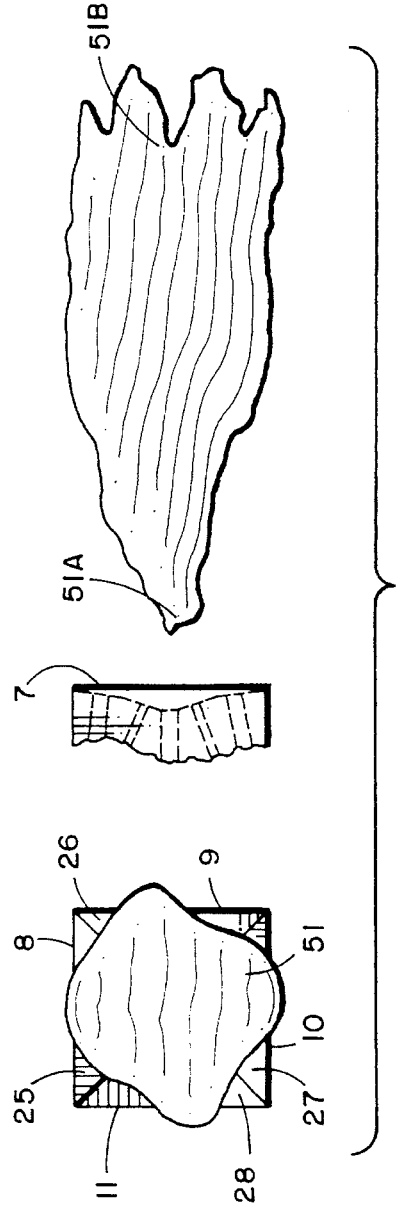

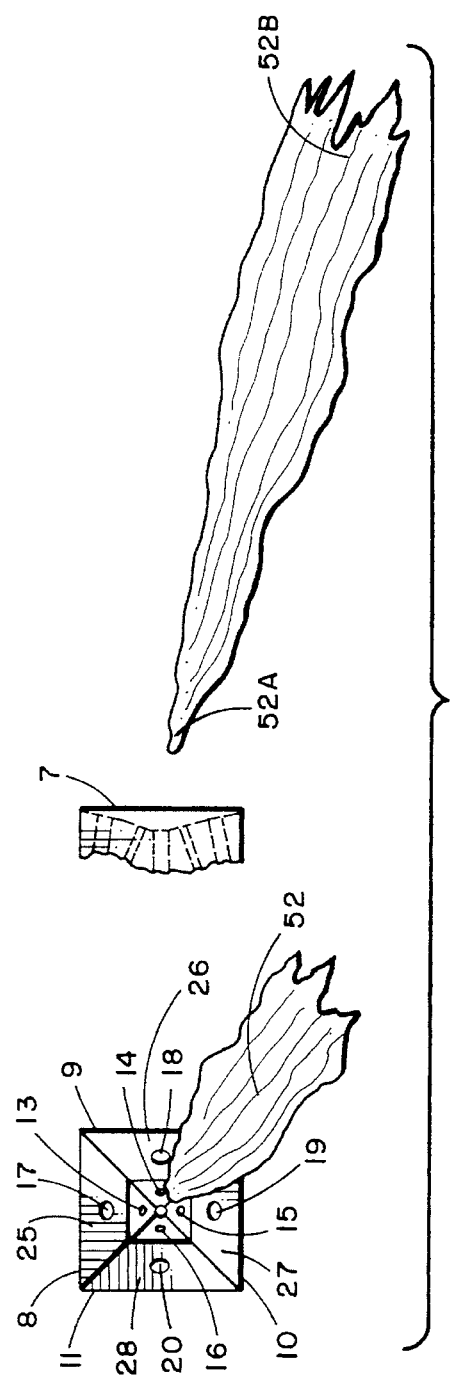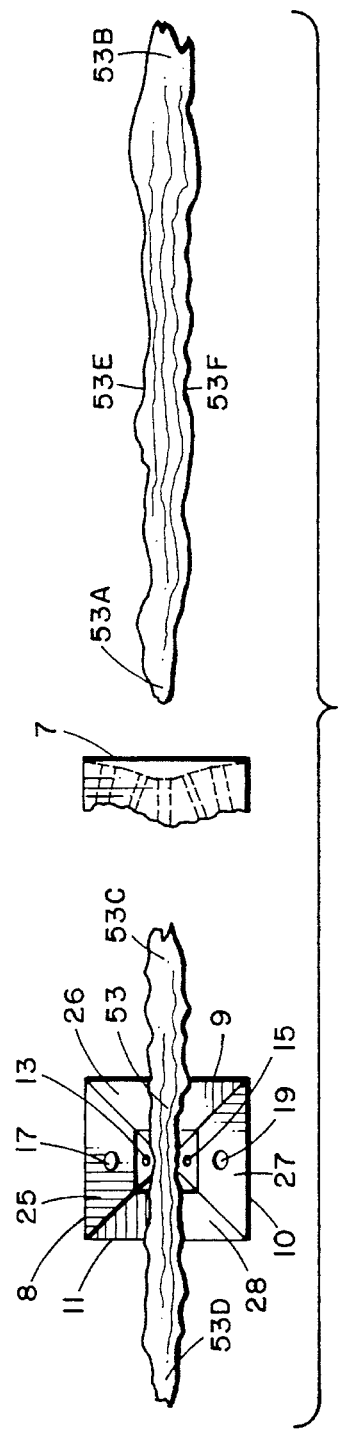

BURNER APPARATUS AND METHOD

BACKGROUND OF THE INVENTION

The present invention relates to a burner apparatus for the combustion of fuel and an oxidizer and especially to a burner apparatus in which the burner flame pattern can be controlled as to the shape and position within the combustion chamber.

The present burner is intended for use where adjustments to a particular flame pattern geometry is critical to the performance of the combustion process and is especially useful in applications where a variety of hydrocarbon fuels are constantly used and removal of the burner apparatus is not possible. The oxidizing medium is supplied to the combustion process by a series of ports that can be varied in momentum and resultant flow direction by simple adjustment of control valves. This adjustment provides the means necessary to utilize a variety of fuels, such as solid, liquid or gaseous, without the need to alter or remove the burner because of a fixed oxidizer design. The oxidizer ports can also be adjusted independent of each other allowing the flame geometry and direction to be changed as required. Variations in the oxidizer flow path enables optimization of thermal efficiencies while at the same time providing the means to minimize oxygen related emissions, such as those involving nitrogen and sulfur.

Current requirements of most industrial burners are not only to provide the necessary heat to the particular process but also to reduce unwanted combustion related pollution. More recently, oxygen/fuel burners (burners utilizing oxygen enriched air or pure oxygen) have been used to meet the emission reduction mandates. While meeting the required reductions, many of the oxygen/fuel burners do not provide the flexibility required by industry. Fixed geometrical configurations and the inability to use a variety of fuels and material limitations are some of the operational drawbacks associated with current oxygen/fuel burners.

The disclosed apparatus is specifically designed for flexibility of operation. Its oxidizer adjustability enables alterations to the flame pattern as required, such as load demand changes or heat transfer inputs. Heat transfer and flame shape vary with different fuels and adjustment capability is critical when a change to fuel type is made. The oxidizer variable momentum and resultant flow direction provide the diversity needed to acquire desirable flame results.

In order to meet the various operational requirements, the present invention is a burner where the oxidizer may have a variable momentum to obtain the needed limits of adjustments. The need for a high degree of adjustment is required to maintain safe and tolerable operation using a highly enriched oxidizer and to provide the means to utilize different fuel types while maintaining a consistently acceptable flame geometry and to enable performance adjustments for maximum attainable emission reductions.

Recently, burners utilize oxygen enriched air for efficiency improvements and emission reductions. With enriched air, there are additional problems with the burner operation. As oxidizer quality approaches near pure to pure oxygen, combustion temperatures increase and a higher rate of material degradation occurs. To counteract the elevated combustion temperatures, the burner uses a stabilized combustion away from the burner exit which enables heat transfer closer to the target and further from the burner, thereby increasing efficiency and extending burner/furnace equipment life. The ability to adjust the flame pattern away from the fuel and oxidizer ports for temperature sensitive equipment is even more critical as preheated oxidizers are used. Preheated oxidizers result in even higher combustion temperatures causing very rapid material degradation should flame patterns not be regulated. The adjustability aspect is important as it pertains to use with preheated oxidizer. Should oxidizer temperatures vary during a given interval, momentum changes can be performed to maintain consistent flame performance.

While the fuel (solid, liquid or gaseous) introduced has a particular momentum, it is in magnitude typically less than that of the oxidizer. This is not to say that the fuel momentum does not play a role in the flame pattern but rather to emphasize the degree of control it influences the overall reaction. Realizing this, control of the oxidizer is crucial in adjustment of the flame pattern in many operational situations, a change of hydrocarbon fuels is required. This change of fuel is readily incorporated by the burner's ability to vary oxidizer momentum. Solid fuels such as coal and wood possess much different transport and combustion characteristics than liquid fuels such as oil or alcohol. In turn, gaseous fuels such as natural gas and propane are different in the same regard as solid and liquid fuels. However, all these fuels are similar in their ability to be manipulated by an external oxidizer medium. A solid fuel is typically crushed into small particles and transported by a portion of the oxidizer, usually air, into the final combustion process. A liquid fuel is transported as a liquid and atomized into small droplets, usually in the form of an atomizing medium comprised of a portion of the oxidizer and introduced into the combustion process. Gaseous fuels are on occasion mixed with a portion of the oxidizer and introduced into the combustion process, but in most cases are transported and introduced as their original composition. The common factor in all three fuel types is that the fuel is supplied in particles, droplets or molecules small enough that it begins to display characteristics of a gaseous medium. This "mimicking" of a gaseous fuel allows the oxidizer momentum to have a considerable effect on the performance of the flame pattern. With the proper oxidizer momentum adjustment, acceptable flame patterns are achievable on the same burner while using different fuels. While the effect of fuel quality and fuel type cannot be ignored, the present invention does provide for the means to adjust oxidizer momentum to compensate for fuel variations.

The burner's adjustment capability also enable the operator to fine tune the performance to minimize any pollutants produced. A change in fuel will necessitate a change to the oxidizer flow configuration. This change will also effect the production of many pollutants in particular derivatives of nitrogen and sulfur. These derivatives are influenced by many factors, temperature and resident time among the most important. With the ability to adjust oxidizer momentum and in effect the flame pattern and temperature undesirable pollutants can be minimized, by adjustment, for any fuel used.

Momentum adjustment to the oxidizer is performed by varying flow among several ports. Four sets of ports are positioned about the fuel port to form a diamond shape fashion. The oxidizer ports are further divided into primary and secondary ports. The primary ports are closest to the fuel port and may have an angular direction toward the fuel. The secondary oxidizer ports are further away from the fuel and may be angled but not necessarily in the same degree as the primary ports. Depending on the required flame pattern, the oxidizer is diverted between primary and secondary ports. This diversion changes the overall momentum as well as the direction of the diverted flow, since primary and secondary ports may not pass the same angles or intersection points. In addition to diversion of oxidizer from primary to secondary, flow may be redirected away from or towards a particular port set. This provides the means necessary to redirect or compensate flame patterns for fuel changes, operational requirements or pollutants reduction.

In our prior U.S. Pat. No. 5,302,112 for a Burner Apparatus and Method of Operation Thereof, a combustion apparatus has independent flow streams, one for an oxidizer and one for a fuel with an adjustable control capability to permit various flame configurations and reproducible combustion rates at different oxidizer and gaseous fuel flow rates. A burner block was used having primary and secondary oxidizer passageways positioned at angles. The burner also had a gaseous fuel supply separated into primary and secondary gaseous fuel paths.

Other prior art U.S. patents may be seen in the Guillaume et al. U.S. Pat. No. 4,494,923, for an oxy-fuel burner having plural feed ports around an electric ignition system. The Anderson U.S. Pat. No. 4,378,205, is an oxygen fuel furnace having a plurality of oxidant jets positioned in a spaced relationship to a fuel jet and having a velocity sufficient to cause an aspiration of the furnace gases into the oxidant jets to mix the fuel. The Gitman U.S. Pat. No. 4,622,007, is for a variable heat generating method and apparatus which uses a hydrocarbon fuel having separately supplied streams of fuel and at least two oxidizing gases to react with the fuel. The Anderson U.S. Pat. No. 4,541,796, is an oxygen aspirator burner for firing a furnace having a plurality of oxidant jets in spaced relationship to the fuel jets. The Fioravanti et al. U.S. Pat. No. 4,954,076, is a nozzle mixed oxy-fuel burner using an oxidant fed at high velocity to aspirate recycled products of combustion. The Leikert, et al. U.S. Pat. No. 4,790,743, is a method of reducing NOX-emissions during combustion of fuel containing nitrogen which feeds a coal dust along with its carrier gas to a primary burner. The Fischer et al. U.S. Pat. No. 4,933,163, is a process of removing hydrogen sulfide from exhaust gas in which oxygen and air are fed through multiple tubes to the combustion chamber. The Ho U.S. Pat. No. 4,957,050, is a combustion process using oxygen or oxygen enriched air as an oxidant in which a liquid fuel is fed to the combustion chamber separate from the oxidants. The Delano U.S. Pat. No. 4,988,285, shows a combustion method in which oxidants are separately injected into the combustion zone in a defined velocity relationship and combustion gases are aspirated into the oxygen stream prior to mixture with the fuel. The Kobayashi et al. U.S. Pat. No. 5,267,850, is a fuel jet burner using a high velocity central fuel stream and a low velocity annular coaxial oxidant stream to carry out stable steady combustion in the expanding combusting stream. The Suzuki et al. U.S. Pat. No. 4,439,132, is for a method and apparatus for combustion with a minimal of NOX-emission and uses two valved air ports spaced from a fuel port.

The present invention has a central fuel feed which can be a gas, liquid, or solid fuel fed through the central fuel port into the combustion chamber and has the oxidants being fed into a plurality of spaced and positioned oxidant feed ports so that varying primary and secondary oxidant feeds for different sets of oxidant ports allows the alteration of flame patterns as required for different processes and allows heat transfer and flame shaped to vary for different fuels or other requirements. The oxidizers variable momentum and resultant flow direction provides the diversity needed for any desired flame result in an oxygen fuel burner.

SUMMARY OF THE INVENTION

A burner apparatus for the combustion of a fuel and an oxidizer includes a burner block having a fuel channel for feeding fuel to a fuel port opening into a combustion chamber and a plurality of primary and secondary oxidizer channels positioned around the fuel channel for feeding an oxidizer to a primary and secondary oxidizer port and to the combustion chamber for combustion with the fuel from the fuel port. The primary and secondary oxidizer channels and ports are spaced around the fuel port so that controlling the oxidizer is used to change the position and shape of the flame in the combustion chamber. A plurality of oxidizer feed lines has one oxidizer feed line connected to the primary oxidizer channel and to one or more adjacent secondary oxidizer channels and the first oxidizer control valve is located in each oxidizer feed line and positioned to vary the amount of oxidizer being fed to each oxidizer line between the primary oxidizer channel and an adjacent secondary oxidizer channel. A second oxidizer valve is located in the oxidizer feed line, and varies the amount of oxidizer fed through the oxidizer line so that the first and second oxidizer control valves for each set of oxidizers spaced around the fuel port allow both the position and the shape of the burner flame to be controlled. A method of controlling a flame in a burner for combustion of fuel and an oxidizer includes selecting the burner apparatus and positioning and shaping the flame by varying the flow of oxidizer to the oxidizer ports and proportioning the oxidizer between secondary and primary ports.

BRIEF DESCRIPTION OF THE DRAWINGS

Other objects, features, and advantages of the present invention will be apparent from the written description and the drawings in which:

FIG. 1 is a perspective view of the burner assembly;

FIG. 2 is a front elevation of the burner of FIG. 1;

FIG. 3 is a sectional view taken on the line 3—3 of the burner of FIGS. 1 and 2;

FIG. 4 shows a detailed sectional view taken on the line 3—3 of FIG. 2;

FIG. 5 shows a sectional view taken on the line 4—4 of FIG. 2 detailing the oxidizer secondary port;

FIG. 6 is a sectional view taken on the line 4—4 of FIG. 2 detailing the oxidizer secondary port with radial angle;

FIG. 7 is a front and left side elevation view of the burner block of FIGS. 1 and 2 depicting an adjustment to achieve a low momentum symmetrical flame pattern;

FIG. 8 is a front and left side elevation view of the burner block of FIGS. 1 and 2 depicting an adjustment to achieve a high momentum symmetrical flame pattern;

FIG. 9 is a front and left side elevation view of the burner block of FIGS. 1 and 2 which a directional flame pattern adjustment has been implemented; and FIG. 10 is a front and left side elevation view of the burner block of FIGS. 1 and 2 in which a flat wide flame pattern adjustment has been implemented.

DETAILED DESCRIPTION OF THE INVENTION

Referring to the drawings and especially to FIGS. 1 and 2, an isometric view of a burner block is shown in which the majority of flame adjustments are derived from the oxidizer. Fuel enters the burner through the fuel inlet 1 and passes through the fuel conduit 2 into burner block 7 and exits through the fuel exit port 12. The fuel type may vary so no attempt has been made to detail any more than the means necessary to introduce fuel to the burner. Transport and conditioning are different for each fuel type but as earlier described, all fuels can be treated as a gaseous medium.

The oxidizer is a gaseous medium with any concentration of oxygen purity and is introduced into the burner through four oxidizer lines, two of which can be seen in FIG. 1. The oxidizer inlet line 3 on the top and oxidizer inlet line 5 on the right side. The oxidizer from the line 3 passes through oxidizer assembly 4 into the oxidizer assembly 4 and into the burner block 7. The burner block 7 is labeled into four distinct regions; the burner block top 8, the burner block right side 9, the burner block bottom 10, and the burner block left side 11. FIG. 2 shows the burner face where the oxidizer and fuel exit to form the flame pattern. The oxidizer exits through the following ports: oxidizer primary top port 13, oxidizer primary right side port 14, oxidizer primary bottom port 15, oxidizer primary left side port 16, oxidizer secondary top port 17, oxidizer secondary right side port 18, oxidizer secondary bottom port 19, and oxidizer secondary left side port 20. The oxidizer primary exit ports are arranged 90 degrees apart with respect the fuel conduit centerline. The oxidizer secondary exit ports are arranged 90 degrees apart with respect to the fuel conduit centerline 40 of FIG. 4, but not necessarily the same orientation as the oxidizer primary exit ports. The oxidizer primary and secondary exit ports can be of any diameter as required by the load and may be spaced to contact each port or adjacent ports (primary and secondary) or up to approximately one hundred port diameters between each port or adjacent ports.

The burner block 7 has port face planes including the primary exit face top 21, the primary exit face right side 22, the primary exit face bottom 23, the primary exit face left side 24, the secondary exit face top 25, the secondary exit face right side 26, the secondary exit face bottom 27, and the secondary exit face left side 28. Exit or port faces can be best described as planes surrounding individual ports. Each port has an exit face and each exit face has its own angular orientation with respect to the fuel conduit centerline 40 of FIG. 4. An exit face angular orientation of zero degrees would be normal to the conduit centerline 40, a positive angle would position the exit face towards the fuel conduit centerline 40 and conversely a negative angle would position the exit face away from the fuel conduit centerline 40. Exit face orientation is independent of the oxidizer port angle and is dictated by the particular application.

Turning to FIGS. 3 and 4, a section view shows the oxidizer bottom assembly 30 and the oxidizer top assembly 31. All four oxidizer assemblies possess the same control hardware but for clarity only two are shown. The oxidizer entering through the oxidizer top line 3 and bottom line 29 passes through oxidizer flow control valves 36 (top) and 38 (bottom). These flow control valves regulate the oxidizer flow to the respective oxidizer assemblies and the flow to each may be different due to operational requirements. The oxidizer fed to each assembly is split between the oxidizer primary conduit (top 32 and bottom 34) and the oxidizer secondary conduit (top 33 and bottom 35). This split is accomplished by the oxidizer biasing valve (top 37 and bottom 39). The oxidizer passes through the burner block 7 and to their respective exit ports where the oxidizer combines with the fuel. A typical oxidizer adjustment may call for a high momentum for rapid combustion. In this case, the biasing valve would be closed down to force the majority of oxidizer flow through the primary conduit increasing the overall velocity. For a lower momentum, the biasing valve would be opened to allow flow to pass through both primary and secondary ports, thus slowing the overall velocity.

FIG. 4 is a more detailed view of FIG. 3 showing the burner block 7 and fuel conduit centerline 40. The top oxidizer primary conduit angle 45 is the angle between the fuel conduit centerline 40 and top oxidizer primary conduit centerline 41. The bottom oxidizer primary conduit angle 46 is the angle between the fuel conduit centerline 40 and bottom oxidizer primary conduit centerline 43. The top oxidizer secondary conduit angle 47 is the angle between the fuel conduit centerline 40 and the top oxidizer secondary conduit centerline 42. The bottom oxidizer secondary conduit angle 48 is the angle between the fuel conduit centerline 40 and the bottom oxidizer secondary conduit centerline 44. Oxidizer primary and secondary conduit angles are independent of each other and may range from zero to 180 degrees. Zero degrees is parallel to the fuel conduit centerline and in the same flow direction. An angle of 180 degrees is parallel to the fuel conduit centerline but against the fuel flow direction. Typically a high oxidizer conduit angle results in a more rapid and intense combustion due to the elevated mixing caused by the severe angles of impact.

FIG. 5 shows a detail of the top oxidizer secondary conduit 33. In this case, the fuel conduit centerline 40 and top oxidizer secondary conduit centerline 42 are overlapping which would indicate that they are both parallel from this perspective. This perspective is from the fuel conduit centerline outward or in a radial direction. FIG. 6 shows the same view as in FIG. 5 except that the fuel conduit centerline 40 and oxidizer secondary conduit centerline 42 are no longer parallel. The angle is called the oxidizer secondary conduit radial angle and can vary from zero to 90 degrees. Zero degrees is parallel to the fuel conduit centerline 40 and 90 degrees is perpendicular to the fuel conduit centerline 40. Each oxidizer has its own radial angle and each may be different. This radial angle provides an additional means to adjust the rate of combustion. Higher angles result in rotational oxidizer flows which keep combustion closer to and in some cases against the block face. The exact angle is dictated by the flame pattern required.

FIGS. 7 and 8 show different oxidizer momentum adjustments and the effect on flame pattern. To achieve a symmetrical flame pattern all oxidizer mass flow is divided evenly through each burner block side 8,9,10,11 of the oxidizer assembly. Each oxidizer primary conduit is equal in mass flow and each oxidizer secondary conduit is also equal in mass flow.

In FIG. 7 the oxidizer biasing valves have been adjusted to pass the majority of the oxidizer through the oxidizer secondary conduits and the minority through the oxidizer primary conduits. The adjustment slows overall oxidizer momentum as well as changes the direction to a more shallow angle. These changes, to produce the low momentum flame pattern 50, slow the rate of combustion to a point where it takes place over a longer distance to produce a long narrow flame.

FIG. 8 shows the same symmetrical mass flow arrangement as FIG. 7 but with the oxidizer biasing valves adjusted to pass the majority of the oxidizer through the oxidizer primary conduits and the minority through the oxidizer secondary conduits. The result is an increase in the combustion rate due to the higher momentum and steeper angle. The high momentum flame pattern 51 is much shorter than the low momentum flame pattern 50 in FIG. 7. Both flame patterns have nearly the same flame pattern beginning (50A, 51A) but the high momentum flame pattern end 51B is much closer to the flame pattern beginning than is the low momentum flame pattern end 51B. In addition, the high momentum flame pattern 51 is much larger in cross section than the low momentum flame pattern 50. Flame pattern 51 totally covers the oxidizer secondary ports where it does not in flame pattern 50.

Turning to FIG. 9, a representation of a nonsymmetrical flame pattern 52 is created for directional flame pattern requirements. It is comparable in momentum to the low momentum flame pattern 50 of FIG. 7. In this case the oxidizer flow control valves on the burner block top 8 and burner block left side 11 have been adjusted to pass a majority of the total of the oxidizer mass flow while the oxidizer flow control valves on the burner block right side 9 and burner block bottom 10 pass a minority of the oxidizer. This nonsymmetrical adjustment forces the nonsymmetrical flame pattern end 52B below and to the right of the non-symmetrical flame pattern beginning 52A. This flame pattern can be shortened by increasing the overall oxidizer momentum as in FIG. 8 but will still retain the nonsymmetrical characteristics. The flame pattern can also be rotated about the fuel conduit centerline by adjustment to distribution of the overall oxidizer flow to each oxidizer assembly.

FIG. 10 offers another possible adjustment where a flat wide flame pattern 53 is desired. Both oxidizer assemblies 31 (top) and 30 (bottom) pass a majority of oxidizer flow while oxidizer assemblies left and right side pass a minority of the oxidizer. The oxidizer biasing valves are in a low momentum adjustment. This flow arrangement forces the fuel between the two colliding oxidizer flows and produces a flat wide flame pattern beginning 53A and flat wide flame pattern end 53B similar to that in FIG. 7 but with a flat wide flame pattern right side 53C and flat wide flame pattern left side 53D and a large cross-sectional diameter. This flat flame pattern is also much thinner from top 53E to bottom 53F. This flat wide flame pattern can also be reproduced in the same manner in any orientation about the fuel conduit centerline 40.

As shown in the flame pattern figures (7,8,9 and 10), a variety of flame patterns are possible. With the broad fuel input base it is necessary to provide large selection of adjustable flame patterns. Larger particles, as used in solid fuels, need more momentum to provide flame pattern stability while gaseous fuels require less momentum for the same flame pattern geometry. In addition, the oxidizer adjustment capabilities provide not only the means necessary to utilize different fuels but also the ability to change flame patterns as needed with each fuel to optimize combustion performance.

In order to maintain the desired flame pattern across a broad base of fuel types, primary and secondary oxidizer port area ratios may vary depending on specific application parameters. The oxidizer port area ratio is defined as the cross-sectional area of the secondary oxidizer port divided by the cross sectional area of the primary oxidizer port of the same burner side. Ratios are independent of other burner sides and may differ depending on requirements. In one instance, a high turndown ability may be desired in which case a higher ratio would provide the necessary large momentum change. Yet in another instance, a fine adjustment to flame pattern through a narrow range of operating loads would dictate a lower ratio. In the case of the described invention, a ratio of approximately four to one provides for the flame pattern adjustment illustrated. Specific ratios would be chosen to optimize the specific area of operational interest while still providing the means to adjust flame pattern for a variety of fuels.

It should be clear that a burner has been provided for combustion of fuel and an oxidizer which provides a wide variety of flame patterns by controlling the oxidizer feeds between spaced primary and secondary oxidizer ports. However, the invention is not to be construed as limited to the forms shown which are to be considered illustrative rather than restrictive.

We claim:

1. A process for controlling a flame in a burner for the combustion of a fuel and an oxidizer comprising the steps of:

selecting a burner having a burner block having a fuel line for feeding fuel to a fuel port opening into a combustion chamber and a plurality of primary oxidizer lines positioned around said fuel line for feeding an oxidizer to a plurality of primary oxidizer ports for feeding an oxidizer to a combustion chamber and a plurality of secondary oxidizer lines positioned around said fuel line for feeding an oxidizer to a plurality of secondary oxidizer ports for feeding an oxidizer to a combustion chamber, at least one said secondary oxidizer line and port being positioned adjacent each primary oxidizer line and port, and a first oxidizer control valve located in each oxidizer feed line and positioned to vary the oxidizer being fed in each oxidizer line between the primary oxidizer line and one adjacent secondary oxidizer line and a second oxidizer control valve located in each said secondary oxidizer feed line for varying the amount of oxidizer fed through said oxidizer line;

varying the position and shape of the burner flame in said burner by proportioning the flow of oxidizer between each said primary oxidizer line and one adjacent secondary oxidizer line by varying each said first oxidizer control valve, whereby the flow in each said first and second oxidizer lines is controlled to control the position and shape of a burner flame.

2. A process for controlling a flame in a burner for the combustion of a fuel and an oxidizer in accordance with claim 1 in which the step of varying the position and shape the burner flame includes varying the flow of oxidizer being fed to each primary oxidizer line and one adjacent second oxidizer line by varying each said second oxidizer control valve.

3. A process for controlling a flame in a burner for the combustion of a fuel and an oxidizer in accordance with claim 1 in which the step of varying the position and shape the burner flame includes varying the flow of oxidizer being fed to each of at least four primary oxidizer lines located on four sides of said fuel port.

4. A process for controlling a flame in a burner for the combustion of a fuel and an oxidizer in accordance with claim 3 in which the step of varying the position and shape the burner flame includes varying the flow of oxidizer being fed to each of at least four secondary oxidizer lines located on four sides of said fuel port.

5. A burner apparatus for the combustion of a fuel and an oxidizer comprising:

a burner block having a fuel channel for feeding fuel to a fuel port opening into a combustion chamber and a plurality of primary oxidizer channels positioned around said fuel channel, each of said plurality of primary oxidizer channels feeding an oxidizer to one of a plurality of primary oxidizer ports for feeding an oxidizer to a combustion chamber and a plurality of secondary oxidizer channels positioned around said fuel channel, each of said secondary oxidizer channels feeding an oxidizer to one of a plurality of oxidizer ports for feeding an oxidizer to a combustion chamber, at least one secondary oxidizer channel and port being positioned adjacent each primary oxidizer channel and port;

a plurality of oxidizer feed lines, one oxidizer feed line being connected to one primary oxidizer channel and to at least one adjacent secondary oxidizer channel; and a first oxidizer control valve located in each oxidizer feed line and positioned to vary the oxidizer being fed in each oxidizer line between the primary oxidizer channel and one adjacent secondary channel and a second oxidizer control valve located in each oxidizer feed line for varying the amount of oxidizer fed through said oxidizer line; whereby said first and second oxidizer lines can be controlled to control the position and shape of the burner flame.

6. A burner apparatus for the combustion of a fuel and an oxidizer in accordance with claim 1 in which said burner block has said plurality of primary oxidizer ports located on four sides of said fuel port.

7. A burner apparatus for the combustion of a fuel and an oxidizer in accordance with claim 6 in which said burner block has said plurality of primary oxidizer ports located about 90 degrees apart around said fuel port.

8. A burner apparatus for the combustion of a fuel and an oxidizer in accordance with claim 7 in which said burner block has said plurality of secondary oxidizer ports located on four sides of said fuel port adjacent each primary oxidizer port.

9. A burner apparatus for the combustion of a fuel and an oxidizer in accordance with claim 8 in which said burner block has said plurality of secondary oxidizer ports located about 90 degrees apart around said fuel port.

10. A burner apparatus for the combustion of a fuel and an oxidizer in accordance with claim 1 in which each said primary oxidizer port is smaller than said secondary oxidizer port.

11. A burner apparatus for the combustion of a fuel and an oxidizer in accordance with claim 10, in which one first oxidizer control valve is located in each said primary oxidizer channel.

12. A burner apparatus for the combustion of a fuel and an oxidizer in accordance with claim 11 in which each primary oxidizer channel is angled in the direction of said fuel channel.

13. A burner apparatus for the combustion of a fuel and an oxidizer in accordance with claim 12, in which each secondary oxidizer channel is angled toward said fuel channel.

14. A burner apparatus for the combustion of a fuel and an oxidizer in accordance with claim 13, in which there are four primary oxidizer ports and four secondary oxidizer ports.

15. A burner apparatus for the combustion of a fuel and an oxidizer in accordance with claim 14 in which each primary oxidizer port is spaced from each secondary oxidizer port by a distance between direct contact and 100 port diameters apart.

16. A burner apparatus for the combustion of a fuel and an oxidizer in accordance with claim 15 in which each said primary oxidizer channel and each adjacent said secondary oxidizer channel are generally parallel to each other.

* * * * *